US007571107B1

(12) United States Patent
Jones et al.

(10) Patent No.: US 7,571,107 B1
(45) Date of Patent: Aug. 4, 2009

(54) SYSTEM AND METHOD FOR EXTERNALIZATION OF RULES FOR ASSESSING DAMAGES

(75) Inventors: Gregory Jones, Hudson, WI (US); Allison W. Spann, Pflugerville, TX (US)

(73) Assignee: Computer Sciences Corporation, Austin, TX (US)

( * ) Notice: Subject to any disclaimer, the term of this patent is extended or adjusted under 35 U.S.C. 154(b) by 855 days.

(21) Appl. No.: 09/603,144

(22) Filed: Jun. 23, 2000

(51) Int. Cl.
*G06Q 40/00* (2006.01)
(52) U.S. Cl. .................................. 705/4; 707/2; 707/6
(58) Field of Classification Search ..................... 705/4, 705/7; 706/47, 6; 707/102, 2, 6
See application file for complete search history.

(56) References Cited

U.S. PATENT DOCUMENTS

| | | | |
|---|---|---|---|
| 4,525,780 A | 6/1985 | Bratt et al. | |
| 4,553,206 A | 11/1985 | Smutek et al. | 707/101 |
| 4,648,062 A | 3/1987 | Johnson et al. | 715/708 |
| 4,812,966 A | 3/1989 | Takagi et al. | 715/539 |
| 4,831,526 A | 5/1989 | Luchs et al. | 705/4 |
| 4,837,693 A | 6/1989 | Schotz | 705/4 |
| 4,839,822 A | 6/1989 | Dormond et al. | |
| 4,878,167 A | 10/1989 | Kapulka et al. | 714/16 |
| 4,964,077 A | 10/1990 | Eisen et al. | 715/707 |
| 4,975,840 A | 12/1990 | DeTore et al. | 705/4 |
| 4,987,538 A * | 1/1991 | Johnson et al. | 705/2 |
| 4,992,972 A | 2/1991 | Brooks et al. | 345/708 |

(Continued)

FOREIGN PATENT DOCUMENTS

EP 0 280 773 9/1988

(Continued)

OTHER PUBLICATIONS

Investigations into database management system support for expert system shells. (vol. I and II) by Johnson, Verlyn Mark Ph. D., University of Minnesota, 1993, 573 pages; AAT 9312489; pp. 1-2.*

(Continued)

*Primary Examiner*—Vanel Frenel
(74) *Attorney, Agent, or Firm*—Meyertons, Hood, Kivlin, Kowert & Goetzel, P.C.; Eric B. Meyertons (57) ABSTRACT

A method and system for externalization of rules for assessing bodily injury general damages. An insurance company may use an expert system to develop a knowledge base in the form of business rules to process insurance claims. The business rules may be executed to assist an insurance claims adjuster in assessing bodily injury general damages. The task of creation and maintenance of the business rules, used in the assessment of claims, may be automated by the externalization of rules. The user may create a rules data table, which includes data necessary to transform it to business rules, based on a rule syntax structure specified in the template table. The transformation method orchestrates the combining of the data from the rules data table and the rule syntax structure specified in the template table and line text table. The new business rule may be saved as text in an insurance database. Changing the data stored in the rules data table and using the transformation method may accomplish updating and/or customizing the business rules.

24 Claims, 4 Drawing Sheets

U.S. PATENT DOCUMENTS

| | | | |
|---|---|---|---|
| 5,008,853 A | 4/1991 | Bly et al. | |
| 5,093,911 A | 3/1992 | Parks et al. | 707/104.1 |
| 5,099,422 A | 3/1992 | Foresman et al. | 705/1 |
| 5,155,806 A | 10/1992 | Hoeber et al. | 345/711 |
| 5,157,768 A | 10/1992 | Hoeber et al. | 345/711 |
| 5,170,464 A | 12/1992 | Hayes et al. | |
| 5,191,522 A | 3/1993 | Bosco et al. | 705/4 |
| 5,201,044 A | 4/1993 | Frey, Jr. et al. | 714/20 |
| 5,233,513 A | 8/1993 | Doyle | 705/7 |
| 5,241,671 A | 8/1993 | Reed et al. | 707/104.1 |
| 5,287,448 A | 2/1994 | Nicol et al. | 345/207 |
| 5,307,262 A | 4/1994 | Ertel | 705/2 |
| 5,307,265 A | 4/1994 | Winans | 704/8 |
| 5,359,509 A | 10/1994 | Little et al. | 705/2 |
| 5,359,660 A | 10/1994 | Clark et al. | |
| 5,386,566 A | 1/1995 | Hamanaka et al. | 709/310 |
| 5,388,251 A | 2/1995 | Makino et al. | 714/57 |
| 5,394,555 A | 2/1995 | Hunter et al. | 711/148 |
| 5,432,904 A | 7/1995 | Wong | 705/4 |
| 5,434,994 A | 7/1995 | Shaheen et al. | 709/310 |
| 5,446,653 A | 8/1995 | Miller et al. | 705/4 |
| 5,455,947 A | 10/1995 | Suzuki et al. | 707/204 |
| 5,471,575 A | 11/1995 | Giansante | 715/503 |
| 5,481,667 A | 1/1996 | Bieniek et al. | 345/709 |
| 5,483,632 A | 1/1996 | Kuwamoto et al. | 345/708 |
| 5,499,330 A | 3/1996 | Lucas et al. | 715/514 |
| 5,504,674 A * | 4/1996 | Chen et al. | 345/667 |
| 5,504,675 A | 4/1996 | Cragun et al. | 705/14 |
| 5,517,405 A | 5/1996 | McAndrew et al. | 706/45 |
| 5,523,942 A | 6/1996 | Tyler et al. | 705/4 |
| 5,535,323 A | 7/1996 | Miller et al. | 345/707 |
| 5,537,315 A | 7/1996 | Mitcham | 705/4 |
| 5,550,734 A | 8/1996 | Tarter et al. | 705/2 |
| 5,550,976 A | 8/1996 | Henderson et al. | 709/201 |
| 5,557,515 A | 9/1996 | Abbruzzese et al. | 705/9 |
| 5,581,677 A * | 12/1996 | Myers et al. | 345/440 |
| 5,586,310 A | 12/1996 | Sharman | 707/10 |
| 5,613,072 A * | 3/1997 | Hammond et al. | 705/35 |
| 5,630,127 A | 5/1997 | Moore et al. | |
| 5,638,508 A | 6/1997 | Kanai et al. | 714/20 |
| 5,644,778 A | 7/1997 | Burks et al. | 705/2 |
| 5,652,842 A * | 7/1997 | Siegrist et al. | 705/2 |
| 5,655,085 A | 8/1997 | Ryan et al. | 705/4 |
| 5,673,402 A | 9/1997 | Ryan et al. | 705/38 |
| 5,689,706 A | 11/1997 | Rao et al. | 707/201 |
| 5,704,044 A | 12/1997 | Tarter et al. | 705/4 |
| 5,717,913 A | 2/1998 | Driscoll | 707/5 |
| 5,732,221 A | 3/1998 | Feldon et al. | 705/3 |
| 5,732,397 A | 3/1998 | DeTore et al. | 705/1 |
| 5,745,901 A | 4/1998 | Entner et al. | 707/103 R |
| 5,748,953 A | 5/1998 | Mizutani et al. | 707/6 |
| 5,768,505 A | 6/1998 | Gilchrist et al. | 709/201 |
| 5,768,506 A | 6/1998 | Randell | 709/202 |
| 5,768,578 A | 6/1998 | Kirk et al. | 707/100 |
| 5,797,134 A | 8/1998 | McMillan et al. | 709/400 |
| 5,809,478 A | 9/1998 | Greco et al. | |
| 5,809,496 A | 9/1998 | Byrd et al. | 707/5 |
| 5,832,481 A | 11/1998 | Sheffield | 707/4 |
| 5,832,530 A | 11/1998 | Paknad et al. | 719/500 |
| 5,835,897 A | 11/1998 | Dang | 705/2 |
| 5,835,914 A | 11/1998 | Brim | 707/206 |
| 5,850,442 A | 12/1998 | Muftic | 705/65 |
| 5,862,325 A | 1/1999 | Reed et al. | 709/201 |
| 5,870,711 A | 2/1999 | Huffman | 709/8 |
| 5,873,066 A | 2/1999 | Underwood et al. | 705/4 |
| 5,884,274 A | 3/1999 | Walker et al. | 705/4 |
| 5,895,461 A | 4/1999 | De La Huerga et al. | 707/1 |
| 5,899,998 A | 5/1999 | McGauley et al. | 707/104.1 |
| 5,903,873 A | 5/1999 | Peterson et al. | 705/4 |
| 5,907,848 A | 5/1999 | Zaiken et al. | 707/202 |
| 5,909,683 A | 6/1999 | Miginiac et al. | 707/103 R |
| 5,913,198 A | 6/1999 | Banks | 705/4 |
| 5,914,714 A | 6/1999 | Brown | 715/866 |
| 5,915,241 A | 6/1999 | Giannini | 705/2 |
| 5,918,208 A | 6/1999 | Javitt | 705/2 |
| 5,930,759 A | 7/1999 | Moore et al. | 705/2 |
| 5,933,816 A | 8/1999 | Zeanah et al. | 705/35 |
| 5,937,189 A | 8/1999 | Branson et al. | 717/101 |
| 5,950,169 A | 9/1999 | Borghesi et al. | 705/4 |
| 5,950,196 A | 9/1999 | Pyreddy et al. | 707/5 |
| 5,956,687 A | 9/1999 | Wamsley et al. | |
| 5,956,691 A | 9/1999 | Powers | 705/4 |
| 5,963,952 A | 10/1999 | Smith | 707/102 |
| 5,970,464 A | 10/1999 | Apte et al. | 705/4 |
| 5,982,369 A | 11/1999 | Sciammarella et al. | |
| 5,987,430 A | 11/1999 | Van Horne et al. | |
| 5,987,434 A | 11/1999 | Libman | 705/36 |
| 5,987,440 A | 11/1999 | O'Neil et al. | |
| 5,991,733 A | 11/1999 | Aleia et al. | 705/8 |
| 5,991,756 A | 11/1999 | Wu | 707/3 |
| 5,995,947 A | 11/1999 | Fraser et al. | 705/38 |
| 5,999,940 A | 12/1999 | Ranger | 707/103 R |
| 6,012,053 A | 1/2000 | Pant et al. | 707/3 |
| 6,016,477 A | 1/2000 | Ehnebuske et al. | |
| 6,016,504 A | 1/2000 | Arnold et al. | 709/200 |
| 6,029,150 A | 2/2000 | Kravitz | 705/39 |
| 6,029,195 A | 2/2000 | Herz | 725/116 |
| 6,038,393 A | 3/2000 | Iyengar et al. | 717/104 |
| 6,038,668 A | 3/2000 | Chipman et al. | 713/201 |
| 6,049,665 A | 4/2000 | Branson et al. | 717/108 |
| 6,061,657 A | 5/2000 | Whiting-O'Keefe | 705/2 |
| 6,064,983 A | 5/2000 | Koehler | 705/31 |
| 6,065,000 A | 5/2000 | Jensen | 707/3 |
| 6,065,047 A | 5/2000 | Carpenter et al. | 709/218 |
| 6,073,104 A | 6/2000 | Field | 705/1 |
| 6,081,832 A | 6/2000 | Gilchrist et al. | 709/206 |
| 6,088,702 A | 7/2000 | Plantz et al. | |
| 6,088,710 A | 7/2000 | Dreyer et al. | 715/517 |
| 6,092,049 A | 7/2000 | Chislenko et al. | 705/10 |
| 6,098,070 A * | 8/2000 | Maxwell | 707/101 |
| 6,105,007 A | 8/2000 | Norris | 705/38 |
| 6,112,986 A | 9/2000 | Berger et al. | 235/380 |
| 6,115,690 A | 9/2000 | Wong | 705/7 |
| 6,119,093 A | 9/2000 | Walker et al. | 705/4 |
| 6,128,598 A | 10/2000 | Walker et al. | 705/4 |
| 6,134,582 A | 10/2000 | Kennedy | 709/206 |
| 6,148,297 A | 11/2000 | Swor et al. | 707/3 |
| 6,163,770 A | 12/2000 | Gamble et al. | 709/4 |
| 6,185,540 B1 | 2/2001 | Schreitmueller et al. | 709/4 |
| 6,202,054 B1 | 3/2001 | Lawlor et al. | 705/42 |
| 6,208,973 B1 | 3/2001 | Boyer et al. | 705/2 |
| 6,226,623 B1 | 5/2001 | Schein et al. | 705/35 |
| 6,236,972 B1 | 5/2001 | Shkedy | 705/1 |
| 6,236,975 B1 | 5/2001 | Boe et al. | 707/7 |
| 6,237,035 B1 | 5/2001 | Himmel et al. | 709/224 |
| 6,239,798 B1 | 5/2001 | Ludolph et al. | 345/788 |
| 6,240,408 B1 | 5/2001 | Kaufman | 707/3 |
| 6,253,203 B1 | 6/2001 | O'Flaherty et al. | |
| 6,266,645 B1 | 7/2001 | Simpson | 705/3 |
| 6,272,471 B1 * | 8/2001 | Segal | 705/4 |
| 6,272,482 B1 * | 8/2001 | McKee et al. | 705/7 |
| 6,272,528 B1 | 8/2001 | Cullen et al. | 709/202 |
| 6,314,419 B1 | 11/2001 | Faisal | |
| 6,330,551 B1 | 12/2001 | Burchetta et al. | 705/80 |
| 6,336,096 B1 | 1/2002 | Jernberg | 705/4 |
| 6,341,265 B1 | 1/2002 | Provost et al. | 705/4 |
| 6,343,271 B1 | 1/2002 | Peterson et al. | 705/4 |
| 6,370,511 B1 | 4/2002 | Dang | 705/3 |
| 6,401,079 B1 | 6/2002 | Kahn et al. | 705/30 |
| 6,449,652 B1 | 9/2002 | Blumenau et al. | |
| 6,456,303 B1 | 9/2002 | Walden et al. | 345/705 |
| 6,467,081 B2 | 10/2002 | Vaidyanathan et al. | |
| 6,473,748 B1 | 10/2002 | Archer | |
| 6,477,533 B2 | 11/2002 | Schiff et al. | 707/10 |

| | | | |
|---|---|---|---|
| 6,480,956 B1 | 11/2002 | DiRienzo | |
| 6,484,178 B1 | 11/2002 | Bence, Jr. et al. | 707/101 |
| 6,560,592 B1* | 5/2003 | Reid et al. | 707/2 |
| 6,584,467 B1 | 6/2003 | Haught et al. | |
| 6,594,697 B1 | 7/2003 | Praitis et al. | 709/225 |
| 6,609,200 B2 | 8/2003 | Anderson | |
| 6,633,316 B1 | 10/2003 | Maddalozzo et al. | |
| 6,636,242 B2 | 10/2003 | Bowman-Amuah | |
| 6,643,652 B2 | 11/2003 | Helgeson et al. | |
| 6,658,568 B1 | 12/2003 | Ginter et al. | |
| 6,681,380 B1* | 1/2004 | Britton et al. | 717/115 |
| 6,728,769 B1 | 4/2004 | Hoffmann | |
| 6,775,658 B1* | 8/2004 | Zothner | 706/47 |
| 6,810,382 B1 | 10/2004 | Wamsley et al. | |
| 2001/0009033 A1* | 7/2001 | Morisaki et al. | 717/1 |
| 2002/0116228 A1 | 8/2002 | Bauer et al. | 705/4 |

FOREIGN PATENT DOCUMENTS

| | | |
|---|---|---|
| EP | 0 465 018 | 1/1992 |
| EP | 0 926 608 | 6/1999 |
| JP | 2002-14950 | 1/2002 |

OTHER PUBLICATIONS

Microsoft Press Computer Dictionary 2nd Edition, Microsoft Press, Redmond WA, 1994.
"High-Performance Communication Networks"; Jean Walrand and Pravin Varaiya; 1996; pp. 361-369; Morgan Kaufmann Publishers.
"Will your Business Model Float?"; Baatz E.B.; Webmaster Magazine; Oct. 1996; http://www.cio.com/archive/webbusiness/100196_float_content.html.
"InsWeb Teams Up with Online Resources; Deal brings online insurance Marketplace to hundreds of financial institutions"; Dec. 2, 1998; pp. 1-3; Business Wire.
"Reliance Group providing On-Line Access to Workers' Comp, Auto, Surety, Professional Liability Coverages; E-Commerce to Exceed $100 Million in 1999"; Dec. 7. 1998; pp. 1-3; Business Wire. Banking Flows Onto Net, Two Austin Software Companies Poised for Boom in Online Service; Ladendorf, Kirk; Dec. 14, 1998; pp. 1-5; Austin American Statesman.
"Time and Billing Gets Webbed"; Antoinette, Alexander; Jun. 1, 2000; pp. 46-50; Accounting Technology, vol. 16, No. 5.
"@ Fault A Commitment to Consistency," Computer Sciences Corporation, Copyright 2000, pp. 1-2.
Borland, Russel; "Running Microsoft Outlook 97," Microsoft Press, 1997.
Howarth, "Outsourcing: Technology on Tap," Business Review Weekly, Dec. 1999, pp. 1-5.
"The OTC Revolution"; Juhl, Randy; Mar. 3, 1997; Drug Topics 141 (5).
Mead, Jay, "Measuring the Value Added by Technical Documentation" Technical Communication Online, Aug. 1998, V. 45, N. 3.
Medisoft Insurance Claims Software Website. May 10, 2000. [Retrieved on Jan. 10, 2003] Retrieved from the Interne URL: <http://web.archive.org/web/20000510094549/http://www.medisoft.com/>.
Merlin, Jr., William F., "Collision Course With the Colossus Program: How to Deal With It," The Merlin Law Group, May 2000, Tampa, FL, pp. 1-17.
Merlin, Jr., William F., "Overcoming Allstate's Trade Secrets and Work-Product Objections," The Merlin Law Group, May 2000, Tampa, FL, pp. 1-31.
Microsoft Corporation, "Holding State in Objects with Microsoft Transaction Server," Jun. 1997, pp. 1-3.
Microsoft Corporation, "Microsoft Component Services, Server Operating System, A Technology Overview," Aug. 15, 1998, pp. 1-7.
Scopus and Entrust Technologies to Deliver World's First Secure Customer Care Solution for the Financial Service Market; PR Newswire dated Nov. 5, 1997.
Utzschneider, "Microsoft Transaction Server and Internet Information Server: Technology for the Web," Feb. 6, 1998, pp. 1-6.
Merlin, Jr., William F., "Colossus: What We Know Today," The Merlin Law Group, Aug. 2000, Tampa, FL, pp. 1-8.
https://www.foremost.com/secure/fm_claims.htm 1996.
Summary of Colossus Functionality as of Dec. 1999.
Investigations into database management system support for expert system shells (vols. I and II) by Johnson, Verlyn Mark, Ph. D, University of Minnesota, 1993, Abstract.
U.S. Appl. No. 09/603,307.
U.S. Appl. No. 09/603,129.
U.S. Appl. No. 09/603,308.
U.S. Appl. No. 09/602,687.
U.S. Appl. No. 09/603,662.
U.S. Appl. No. 09/603,302—Claims Only, Specification and Figures are similar to U.S. Appl. No. 09/603,662.
U.S. Appl. No. 09/602,691—Claims Only, Specification and Figures are similar to U.S. Appl. No. 09/603,662.
U.S. Appl. No. 09/603,130.
U.S. Appl. No. 09/603,303.
U.S. Appl. No. 09/603,304.
U.S. Appl. No. 09/603,306.
U.S. Appl. No. 10/285,292.
U.S. Appl. No. 10/285,289—Claims Only, Specification and Figures are similar to U.S. Appl. No. 10/285,292.
U.S. Appl. No. 10/285,339—Claims Only, Specification and Figures are similar to U. S. Appl. No. 10/285,292.
U.S. Appl. No. 10/285,375—Claims Only, Specification and Figures are similar to U.S. Appl. No. 10/285,292.
U.S. Appl. No. 10/285,338—Claims Only, Specification and Figures are similar to U.S. Appl. No. 10/285,292.
U.S. Appl. No. 10/285,293—Claims Only, Specification and Figures are similar to U.S. Appl. No. 10/285,292.
U.S. Appl. No. 10/422,632.
U.S. Appl. No. 10/422,450—Claims Only, Specification and Figures are similar to U.S. Appl. No. 10/422,632.
Continuum Connections, vol. I, No. 1, The Continuum Company, Inc., Nov. 1991, 16 pages.
Continuum Connections, vol. I, No. 2, The Continuum Company, Inc., Jan./Feb. 1992, 17 pages.
Continuum Connections, vol. I, No. 3, The Continuum Company, Inc., Mar./Apr. 1992, 16 pages.
Continuum Connections, vol. I, No. 4, The Continuum Company, Inc., Jul./Aug. 1992, 15 pages.
Continuum Connections, vol. II, No. 1, The Continuum Company, Inc., Oct./Nov. 1992, 16 pages.
Continuum Connections, vol. II, No. 2, The Continuum Company, Inc., Dec./Jan. 1993, 24 pages.
Continuum Connections, vol. II, No. 3, The Continuum Company, Inc., Mar./Apr. 1993, 16 pages.
Continuum Connections, vol. II, No. 4, The Continuum Company, Inc., Jul./Aug. 1993, 16 pages.
Continuum Connections, vol. II, No. 5, The Continuum Company, Inc., Nov./Dec. 1993, 20 pages.
Continuum Connections, vol. II, No. 6, The Continuum Company, Inc., Jan./Feb. 1994, 19 pages.
Continuum Connections, vol. III, No. 1, The Continuum Company, Inc., Mar./Apr. 1994, 24 pages.
Continuum Connections, vol. III, No. 2, The Continuum Company, Inc., Nov./Dec. 1994, 20 pages.
Continuum Connections, vol. III, No. 3, The Continuum Company, Inc., Mar./Apr. 1995, 16 pages.
Continuum Connections to the Americas, vol. 1, No. 1, The Continuum Company, Inc., Sep. 1995, 49 pages.
Continuum Connections, vol. III, No. 4, The Continuum Company, Inc., Oct./Nov. 1995, 24 pages.
Continuum Connections to the Americas, vol. 2, No. 1, The Continuum Company, Inc., Jan. 1996, 59 pages.
Continuum Connections to the Americas, vol. 2, No. 2, The Continuum Company, Inc., Mar. 1996, 50 pages.
Continuum Connections to the Americas, vol. 2, No. 3, The Continuum Company, Inc., May 1996, 51 pages.
Continuum Connections to the Americas, vol. 2, No. 4, The Continuum Company, Inc., Jul. 1996, 55 pages.
Continuum Connections to the Americas, vol. 2, No. 5, The Continuum Company, Inc., Sep. 1996, 59 pages.

Connections to the Americas, vol. 3, No. 1, CSC Continuum, Jan. 1997, 55 pages.
Connections to the Americas, vol. 3, No. 2, CSC Continuum, Feb. 1997, 55 pages.
Connections to the Americas, vol. 3, No. 3, CSC Continuum, Mar. 1997, 48 pages.
Connections to the Americas, vol. 3, No. 4, CSC Continuum, Apr. 1997, 40 pages.
Connections to the Americas, vol. 3, No. 5, Computer Sciences Corporation, May/Jun. 1997, 66 pages.
Connections to the Americas, vol. 3, No. 6, Computer Sciences Corporation, Jul./Aug. 1997, 56 pages.
Connections to the Americas, vol. 3, No. 7, Computer Sciences Corporation, Sep./Oct. 1997, 76 pages.
Connections to the Americas, vol. 4, No. 1, Computer Sciences Corporation, Jan. 1998, 64 pages.
Connections to the Americas, vol. 4, No. 2, Computer Sciences Corporation, Feb./Mar. 1998 50 pages.
Connections to the Americas, vol. 4, No. 3, Computer Sciences Corporation, May/Jun. 1998, 48 pages.
Connections to the Americas, vol. 4, No. 4, Computer Sciences Corporation, Sep./Oct. 1998, 62 pages.
Insurance Connections, Computer Sciences Corporation, Feb./Mar. 1999, 52 pages.
Banking Connections, Computer Sciences Corporation, Apr./May 1999, 44 pages.
Insurance Connections, Computer Sciences Corporation, Jun./Jul. 1999, 56 pages.
Insurance Connections, Computer Sciences Corporation, Oct./Nov. 1999, 56 pages.
Cost Containment: Products and Solutions for the Property and Casualty Insurance Industry, Computer Sciences Corporation, Oct. 1999, 40 pages.
Banking Connections, Computer Sciences Corporation, Dec. 1999, 48 pages.
Insurance Connections, Computer Sciences Corporation, Feb./Mar. 2000, 60 pages.
Banking Connections, Computer Sciences Corporation, Apr./May 2000, 48 pages.
Insurance Connections, Computer Sciences Corporation, Jun./Jul. 2000, 43 pages.
Insurance Connections, Computer Sciences Corporation, Sep./Oct. 2000, 43 pages.
Banking Connections, Computer Sciences Corporation, Nov./Dec. 2000, 48 pages.
"The Continuum Company Announces Colossus™ Licenses," Continuum Financial News Release, The Continuum Company, Inc., Apr. 7, 1995, 1 page.
"The Continuum Company Announces Colossus License," Continuum Financial News Release, The Continuum Company, Inc., Jul. 13, 1995, 1 page.
"The Continuum Company Announces Colossus License," Continuum Financial News Release, The Continuum Company, Inc., Jul. 17, 1995, 1 page.
"The Continuum Company Announces Colossus™ Sale,"Continuum Financial New Release, The Continuum Company, Inc., Oct. 9, 1995, 1 page.
"The Continuum Company Announces Colossus™ Sale To General Accident," Continuum Financial News Release, The Continuum Company, Inc., Nov. 7, 1995, 1 page.
"The Continuum Company Announces Second European Colossus Sale," Continuum Financial News Release, The Continuum Company, Inc., Jan. 5, 1996, 1 page.
"The Continuum Company Announces Colossus™ Sale," Continuum Financial News Release, The Continuum Company, Inc., Mar. 7, 1996, 1 page.
"The Continuum Company Announces Colossus License," Continuum Financial News Release, The Continuum Company, Inc., May 9, 1996, 2 pages.
"The Continuum Company Announces Colossus Sale," Continuum Financial News Release, The Continuum Company, Inc., Jun. 12, 1996, 2 pages.
"The Continuum Company Announces Colossus Sale," Continuum Financial News Release, The Continuum Company, Inc., Jul. 3, 1996, 1 page.
"CSC Continuum Announces Colossus Sale," News Release, Computer Sciences Corporation, Sep. 17, 1996, 2 pages.
"CSC Continuum Announces Colossus License," News Release, Computer Sciences Corporation, Sep. 17, 1996, 2 pages.
"CSC Continuum Announces COLOSSUS™ License," News Release, CSC Continuum, Nov. 21, 1996, 2 pages.
"USAA Licenses Colossus™," News Release, CSC Continuum, Feb. 10, 1997, 2 pages.
"20$^{th}$ Century Industries Licenses Colossus™," News Release, CSC Continuum, Feb. 10, 1997, 2 pages.
"Arrow Claims Management Licenses COLOSSUS™," News Release, Computer Sciences Corporation, Aug. 6, 1997, 2 pages.
"American Family Insurance Renews COLOSSUS™ License," News Release, Computer Sciences Corporation, Dec. 8, 1997, 2 pages.
"Explorer Insurance Company Licenses COLOSSUS™," News Release, Computer Sciences Corporation, Dec. 8, 1997, 2 pages.
Greenleaf, Graham, A Colossus come to judgement: GIO's expert system on general damages, University of New South Wales (published in the Law & Information Technology column, Australian Law Journal) Nov. 26, 1992, 6 pages.
Beinat, Paul, Artificial intelligence helps boost Australian profits, Property-Casualty Insurance Edition Apr. 97, vol. 97, Issue 12, p. 22, 2/3 p.
Attrino, Tony, Software helps bolster claims assessment, National Underwriter/ Property & Casualty Risk & Benefits, May 4, 1998, vol. 102, Issue 18, p. 14, 2p.
COLOSSUS'—A claims management system, creates standard for measuring pain/ sufering claims, Insurance Advocate, May 8 1999, vol. 110, Issue 19, p. 25, 1/4 p.
Schwartz, Susana, CSC wraps traditional insurance solutions into a neat new package, Insurance and Technology, Sep. 1998, vol. 23, Issue 9, p. 61, 2p.
Bremer, Christine, and Lance Trollop, Colossus: What Colossus is and what it does, accessed at http:/ /www.watl.org. Verdict%20articles/colossus.htm on May 6, 2004.
Scopus and Entrust: Call Center Sales Helper is Unveiled, Nov. 10, 1997; vol. 162, Issue 217, p. 19.
International search report application No. PCT/US01/ 20030, mailed Nov. 1, 2001, 5 pages.
Allstate Creates New Customer Care Center Internet Service, Apr. 13, 1999, accessed at www.allstate.com/media/newsheadlines.
Allstate Announces Online Claim Reporting Capabillities, Sep. 13, 1999, accessed at www.allstate.com/media/newsheadlines.
Australian patent application 2001268693—Examiner's first report on patent application, Apr. 21, 2006.
http://web.archive.org/web/20000605062238/http://www.wawanesa.com/insure_claims_process.htm, (Wawanesa Insurance) Jun. 5, 2000.

* cited by examiner

SYSTEM AND METHOD FOR EXTERNALIZATION OF RULES FOR ASSESSING DAMAGES

BACKGROUND OF THE INVENTION

1. Field of the Invention

The present invention generally relates to the field of insurance claims. More particularly, the present invention relates to a system and method for externalization of rules for assessing bodily injury general damages.

2. Description of the Related Art

Insurance companies have been processing and settling claims associated with bodily injury for a long time. The task of evaluating, analyzing or estimating the amount of damage associated with one or more types of bodily injuries, especially trauma-induced bodily injuries, can be very complex. Complexity in the evaluation process often arises out of the fact that concurrent expertise in legal, medical and insurance fields is often required to arrive at a particular decision involving a bodily injury claim.

Several factors can affect the estimated amount of the claim associated with a bodily injury. Every accident is different and every injury is unique. Arriving at a customized evaluation of a bodily injury claim, which is unique for a specific accident, injury, etc. is desirable. Applying across-the-board standards may tend to result in an inequitable solution for one or more parties involved. External environmental factors, such as the experience level of a claims adjuster, record of accomplishment of the legal professionals, post-injury quality of life for the injured party, etc., all can affect the valuation of a claim.

During the past several years, many insurance companies have been using computer-based and knowledge-based claim-processing systems to process, evaluate, analyze and estimate thousands of claims in a fair and consistent manner. A knowledge-based claim-processing system includes an expert system which utilizes and builds a knowledge base to assist the user in decision making. It may allow the insurance companies to define new rules and/or use previously defined rules, in real-time. The business rules are generally written by industry experts to evaluate legal, medical, insurance conditions before arriving at a valuation of a claim.

There were several drawbacks with the prior art knowledge-based system. For example, the business rules used in the prior art often lacked flexibility. The business rules were often hard-coded in the insurance claim processing software. Every time there was a new business requirement, it was necessary to change the source code. In some cases, this inflexibility resulted in delaying the incorporation of the new business rules until the next system release date. Thus the insurance claim processing software was unable to adapt quickly to changing business conditions. This reduced the users' and therefore the insurance companies' flexibility to respond to changing business conditions in assessing bodily injury claims.

Very often, the user may have special or unique requirement, which may need the standard business rules to be modified (i.e., customized) to meet a specific application. The hard-coding method used in the prior art would not easily permit the customization of the business rules in a cost and time effective manner.

It is, therefore, desirable to develop a new system and method for externalization of rules for assessing bodily injury general damages. It is desirable for the rules to be easily updateable based on external business conditions. It is also desirable for the rules to be customizable to meet specific user requirements. Thus, the new system and method for externalization of rules should be of a flexible design, to meet user requirements.

SUMMARY OF THE INVENTION

The present invention provides various embodiments of a system and method for externalization of rules to assess bodily injury general damages. In one embodiment, an insurance company may use an expert system to develop a knowledge base in the form of business rules to process insurance claims. A rules engine operable to execute the business rules may assist an insurance claims adjuster in assessing damages associated with bodily injury claims.

The task of creation and maintenance of the business rules, used in the assessment of claims, may be automated by the externalization of rules. In one embodiment, the database, which is external to the rules engine, may store all business rules, program instructions, data, tables, objects, etc. associated with the processing of insurance claims. In one embodiment, the database may be an object oriented or a relational database. In one embodiment, the database may include a plurality of knowledge bases often stored in the form of tables. The user may create a rules data table, which is an embodiment of a knowledge base and which includes data necessary to transform the data to business rules, based on a rule syntax structure specified in the template table. In one embodiment, a rule style or a rule syntax structure includes a premise and one or more resulting actions. The entire set of business rules created to process insurance claims may be classified into a plurality of rule styles. In one embodiment, new rule styles may be created and added to existing rule styles to customize the business rules.

The transformation method, in one embodiment, orchestrates the combining of the data from the rules data table and the rule syntax structure specified in the template table and line text table. Each row of the rules data table may be read at a time. Data stored in each column of the rules data table may be used to transform or create the business rules. In one embodiment, entries for rules style may be used as a key to read a matching record in the template table. The matching record in the template table may specify the specific rule syntax structure. The new business rule may be saved in an associated knowledge base.

By changing or modifying the data stored in the rules data table and using the transformation method it may be possible to update the business rules. Changing or adding new entries to the rules style may customize the business rules.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION OF SEVERAL EMBODIMENTS

Figure 1A:
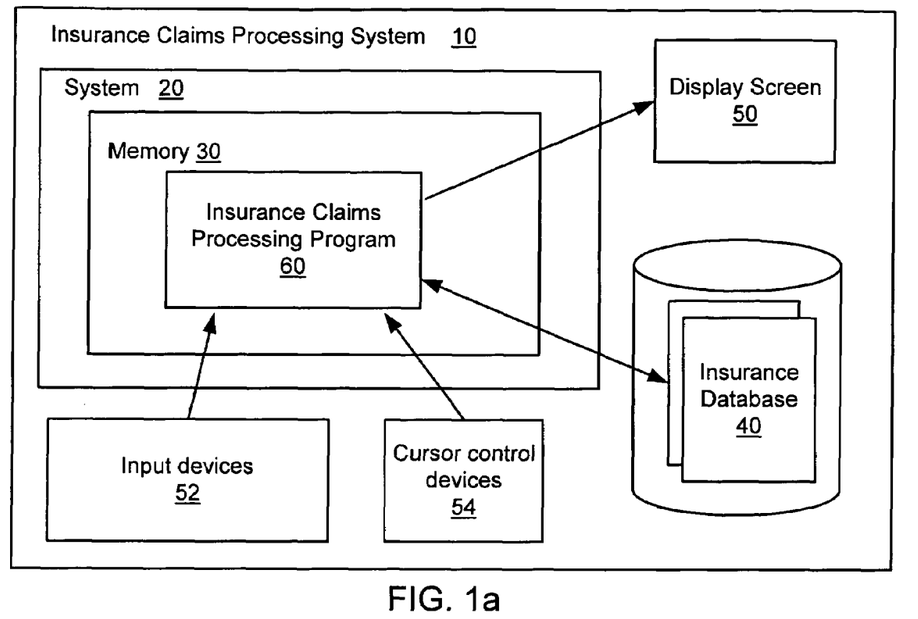
FIG. 1*a* is a block diagram illustrating the architecture of one embodiment of an insurance claims processing system.

FIG. 1a

A Block Diagram Illustrating the Architecture of One Embodiment of an Insurance Claims Processing System In FIG. 1a, an embodiment of an insurance claims processing system 10 may include a computer system 20. The term "computer system" as used herein generally includes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium.

The memory medium preferably stores a software program or programs for processing insurance claims as described herein. The software program(s) may be implemented in any of various ways, including procedure-based techniques, component-based techniques, and/or object-oriented techniques, among others. For example, the software programs may be implemented using a rule-based development tool such as PLATINUM Aion™ available from Computer Associates International, Inc. In one embodiment, PLATINUM Aion™ may combine business rule and object-oriented technologies to create and maintain complex, knowledge-intensive applications. Software developed with PLATINUM Aion™ may employ an Aion™ programming language for automation of processes which may use hundreds or thousands of business rules from a knowledge base. An Aion™ inference engine may automatically determine which rules to execute, when, and in what order. In various other embodiments, the software program may be implemented using other technologies, languages, or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory, as the data is required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems.

The insurance claims processing system 10 may further include a display screen 50 connected to the computer system 20 and an insurance database 40 residing on an internal or external storage. The database may also be referred to as a repository. As used herein, a "database" may include a collection of information from which a computer program may select a desired piece of data. As used herein, an "insurance database" is used as a synonym for a "database" when included in or coupled to an insurance claims processing system 10. System 20 includes memory 30 configured to store computer programs for execution on system 20, and a central processing unit (not shown) configured to execute instructions of computer programs residing on system 20. Claims processing program 60, also referred to as application program software 60, may be stored in memory 30. As used herein, an "insurance claims processing program" 60 may include a software program which is configured to conduct transactions regarding insurance claims, such as by estimating the value of the insurance claims, for example.

The insurance claims processing system 10 may be used by an Insurance Company for various embodiments of a system and method for externalization of rules for assessing bodily injury general damages associated with a bodily injury insurance claim. As used herein, an Insurance Company (IC) includes a business organization that provides insurance products and/or services to customers. More particularly, the insurance products may pertain to providing insurance coverage for accidents and the trauma-induced bodily injuries that may result due to the accident. Examples of trauma-induced bodily injuries may include, but are not limited to: loss of limb(s); bone fractures; head, neck and/or spinal injury, etc.

In one embodiment, on receiving a trauma-induced bodily injury, a customer may file an insurance claim with his/her insurance organization to cover medical and other accident-related expenses. An IC may utilize a computer-based insurance claim processing system to process insurance claims. In one embodiment, the processing may include estimating a financial value associated with the filed insurance claim.

As used herein, an IC business transaction may be defined as a service of an IC. Examples of business transactions include, but are not limited to: insurance transactions such as filing of claims, payment of claims, application for insurance coverage, and customized benefits, etc. Business transactions may also include services related to customers, insurance providers, employers, insurance agents, investigators, etc.

As used herein, an IC insurance claim processing includes a series of instructions executed by a computer system for processing an IC's business transactions. A claim processing system may include one or more processing tasks. A processing task may include a sequence of one or more processing steps or an ordered list or a structured list of one or more processing steps, associated with the business transaction to be processed by the claim processing system. In one embodiment, the sequence of steps may be fixed. In another embodiment the sequence of steps may be established dynamically, in real-time. In one embodiment, the sequence of one or more steps may include an initial step, a final step, one or more intermediary steps, etc. In one embodiment, an IC user may select steps to process an insurance claim in a sequential manner. In another embodiment, the IC user may select steps to process an insurance claim in a random or arbitrary manner. Examples of processing steps may include, but are not limited to: receiving an input from a user of the IC insurance claim processing system, reading a value from a database, updating a field in a database, displaying the results of a business transaction on a computer screen, etc.

In one embodiment, the insurance claim processing system may execute rules in the form of program instructions in response to completion of certain steps, events, user inputs, etc. and as part of processing of the insurance claim. The execution of the rules may result in certain actions such as selection of the next step, performing calculations, generating an error message, waiting for user input, etc. The specific number or type of rules executed will vary depending on the type of injuries, the type of treatments, etc. specified in the bodily injury damages claim.

In one embodiment, the insurance claim processing system utilizes object-oriented technology to process insurance claims and assess bodily injury damages. In another embodiment, processing of insurance claims may utilize traditional programming languages and databases to achieve the same result. Insurance objects may be defined to represent or model real-world business features of insurance products and services. Examples of insurance objects may include, but are not limited to, objects representing the following: an insurance claim; an accident report; a settlement; an estimated claim; IC service facilities, customers, and employees; business process such as a new insurance application and calculation of a premium; interfaces to external insurance organizations; work tasks such as calculations, decisions, and assignments; temporal objects such as calendars, schedulers, and timers; and elemental data necessary to accomplish work tasks such as medical costs, risk factors, etc.

An insurance object may be represented on the computer screen by a graphical icon or by a display listing the properties of the insurance object in graphic and alphanumeric format. An insurance claim object may be configured to gather and evaluate data for processing a filed insurance claim and to automatically make decisions about the insurance claim. The one or more processing steps associated with the processing of an insurance claim may also be configured as one or more processing step objects. In one embodiment, a display screen may be associated with a processing step. The display screen may also be represented as an object. Each display screen object may include a property to point to a previous display and another property to point to a next display screen. Each property, e.g. the next display pointer on a display screen object, may be changed dynamically by using methods associated with the display screen object. One display screen object may serve as the starting point for processing insurance claims. In one embodiment, the starting point for processing insurance claims may include acquiring an insurance claim identification number from an IC system user.

In one embodiment, during the processing of an insurance claim, a business rule and/or an IC system user input may determine that the insurance claim processing needs the execution of additional steps or tasks to continue the processing of the claim. The IC system user may provide inputs to the insurance claims processing program 60 at any display screen associated with a step. The insurance claim processing software may dynamically modify the number of steps and/or the sequence of their execution to complete the claim processing transaction. An IC system user working at a client system may then iterate through the claim processing steps and assess a bodily injury damages associated with the insurance claim.

In one embodiment, upon startup, the program 60 may provide a graphical user interface to display claims processing related information on display screen 50. It may collect user inputs, entered by using user input devices 52, and associated with insurance claims. It may process the user inputs, access an insurance database 40, use the contents of the insurance database 40 to estimate the insurance claim, and store it in memory 30 and/or insurance database 40. The program 60 may display a value of the estimated insurance claim on display screen 50. A user may view the display of the estimated insurance claim on display screen 50, and may interactively make modifications, additions, and deletions to the estimated insurance claim.

System 20 may also include one or more user input devices 52, such as a keyboard, for entering data and commands into the insurance claim program 60. It may also include one or more cursor control devices 54 such as a mouse for using a cursor to modify an insurance claim viewed on display screen 50. In response to the updating of the estimated insurance claim, the insurance claim program 60 may store the updated insurance claim in the insurance database 40.

Figure 1B:
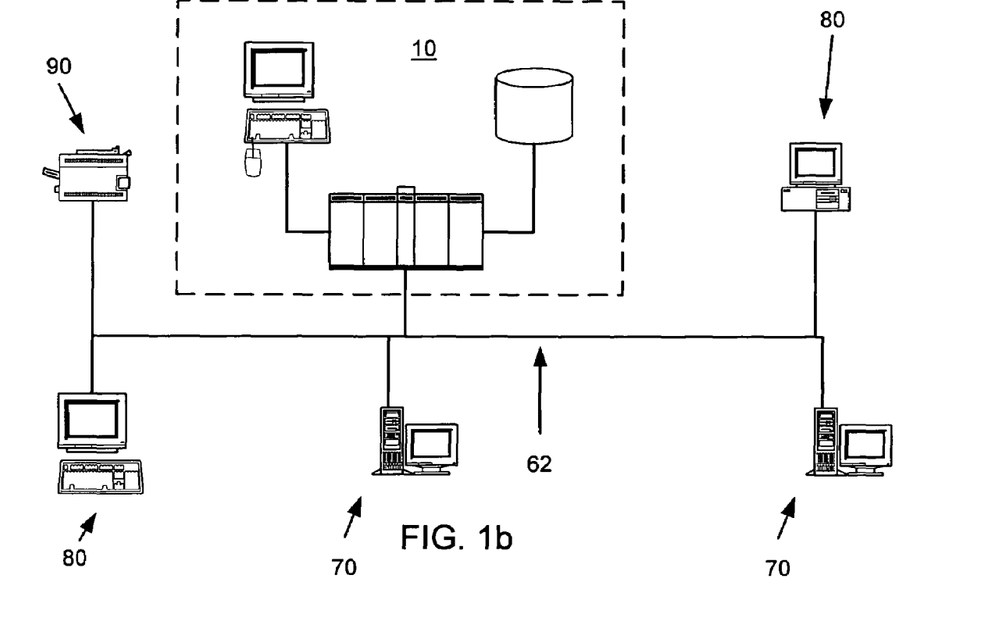
FIG. 1*b* illustrates one embodiment of a networked insurance claim processing system.

FIG. 1b

One Embodiment of a Networked Insurance Claim Processing System

FIG. 1b illustrates one embodiment of a networked system, configured for processing insurance claims. In this embodiment, the system is shown as a client/server system with the server systems and client systems connected by a network 62. Network 62 may be a local area network or wide area network, and may include communications links including, but not limited to: Ethernet, token ring, Internet, satellite, and modem. Insurance claims processing system 10 as illustrated in FIG. 1a may be connected to network 62. The insurance claims processing system software and insurance database 40 may be distributed among the one or more servers 70 to provide a distributed processing system for insurance claim transactions. In other words, an insurance claim processing transaction being processed by the insurance claim processing system may be routed to any server based upon the workload distribution among servers 70 at the time of the transaction. Insurance claim processing system servers 70 may be located on a local area network or may be geographically dispersed in a wide area network.

One or more client systems 80 may also be connected to network 62. Client systems 80 may reside at one or more claim processing units within the insurance company. In a wide area network, client systems 80 may be geographically dispersed. Client systems 80 may be used to access insurance claim processing system servers 70 and insurance database 40. An insurance claim-processing employee may use a client system 80 to access the insurance claim processing system and execute insurance transactions. An employee may also use a client system 80 to enter insurance claim inputs into the insurance claim processing system. One or more printers 90 may also be connected to network 62 for printing documents associated with insurance claim transactions.

Various embodiments further include receiving or storing instructions and/or data implemented in accordance with the description herein upon a carrier medium. Suitable carrier media include memory media or storage media such as magnetic or optical media, e.g., disk or CD-ROM, as well as transmission media or signals such as electrical, electromagnetic, or digital signals, conveyed via a communication medium such as networks and/or a wireless link.

Figure 2:
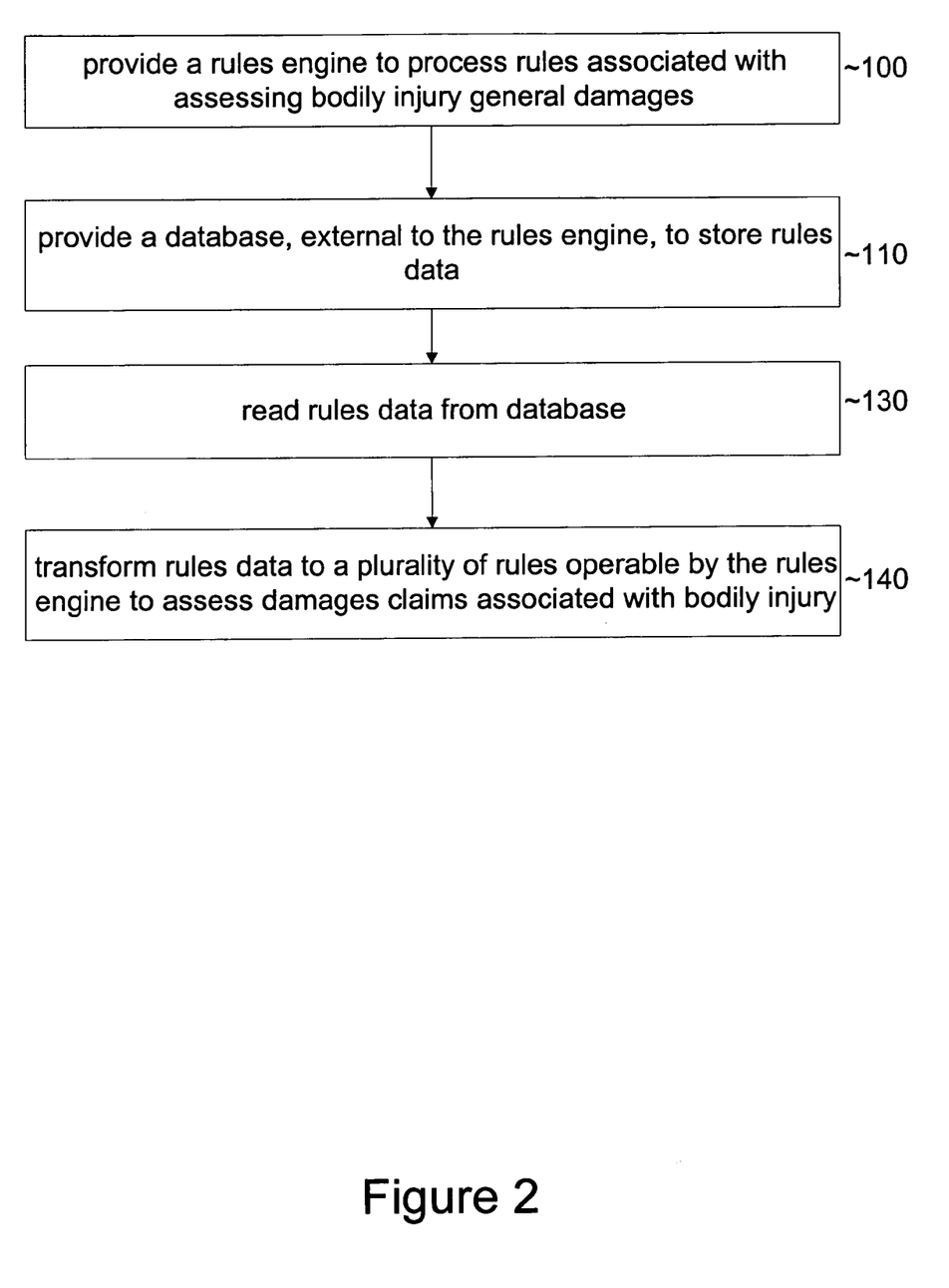
FIG. 2 illustrates a flow chart to transform rules data to rules for assessing bodily injury damages claims according to one embodiment.

FIG. 2

A Flow Chart to Transform Rules Data to Rules for Assessing Bodily Injury Damages Claims According to One Embodiment FIG. 2 illustrates one embodiment of a method to transform rules data to rules for assessing bodily injury damages claims according to one embodiment. In step 100, the user or the administrator of the insurance claim processing system 20 provides a rules engine, which is capable of processing rules associated with assessing bodily injury damages claims. The rules engine may be included as part of the insurance claims processing system 10, such as the insurance claims processing program 60, as shown in FIG. 1a. As used herein, a "rules engine" may include an expert system which is operable to produce an output as a function of a plurality of rules. A rules engine, in one embodiment, may include an expert computer system which utilizes and builds a knowledge base developed in the form of business rules and/or formulas to assist the user in decision-making.

It allows the insurance companies to capture the knowledge base of their experts by defining business rules. Once created, the expertise may be used in processing many transactions, including assessing bodily injury damages claims. The business rules enable claim-processing professionals to be assisted by industry experts to evaluate legal, medical, insurance conditions before arriving at a valuation of an insurance claim. In one embodiment, the rules engine may be developed using a commercial rule-based development tool such as PLATINUM Aion™, which is available from Computer Associates International, Inc.

Business rules, often referred to simply as rules, are executable computer program instructions. The rules include computer commands or logical instructions to achieve a certain function. For example, rules may guide an assessment or estimate of bodily injury general damages. Each rule, in one embodiment, includes a premise followed by one or more resulting actions. For example, in one embodiment, a business rule may state 'If patient requires hospitalization after emergency care treatment then the trauma severity level should be classified as major'. In this case, the premise is 'patient requires hospitalization after emergency care treatment'. The resulting action is 'trauma severity level should be classified as major'. In one embodiment, the insurance claim processing system may include several thousand business rules. The rules may be executed or fired, under the control of the insurance claim processing software, based on certain events, user inputs, etc. Only pertinent rules, i.e., a subset of all the available rules, are typically selected and executed for processing a specific bodily injury damages claim.

In step 110, the user or the administrator of the insurance claim processing system 20 provides a database 40, which is external to the rules engine, and is capable of storing and/or retrieving information associated with insurance claim processing. As used herein, the term "external" means that the database is separate from the rules engine. The type of information stored and/or retrieved may include, but not be limited to, business objects, tables, rules, software source code, executable software, etc. In one embodiment, the database may be relational. In another embodiment, the database 40 may be an object-oriented database.

In one embodiment, the database 40 may include a plurality of tables, often referred to as knowledge-bases, which may be accessed by an translator program or other application program to transform or create or generate the data stored in the tables into rules. In another embodiment, the application program may transform data stored in tables into static instances of an object class. In one embodiment, for example, the rules data table as shown by way of example in FIG. 3a includes data structured in a tabular format, i.e., a table with several rows and columns. The rules data table includes all the relevant information necessary to transform each row of the rules data table into an equivalent business rule.

The entire set of business rules may be grouped or classified into a plurality of rule styles. Each rule style may have a common construction style, i.e., the syntax for the rule premise and the resulting rule action may be common. In one embodiment, there may be several hundred pre-defined rules styles. New rule styles to meet user requirement may also be created and added to the existing rule style list or table. Data included in the rules data table shown in FIG. 3a may typically include information necessary to construct the rule premise and the resulting one or more rule actions. In one embodiment, the rules data table shown in FIG. 3a may include, but not be limited to, columns such as an injury code 300, an adjustment type, an adjustment amount 310, a rule style 330, a rule name 320, etc.

Figure 3A:
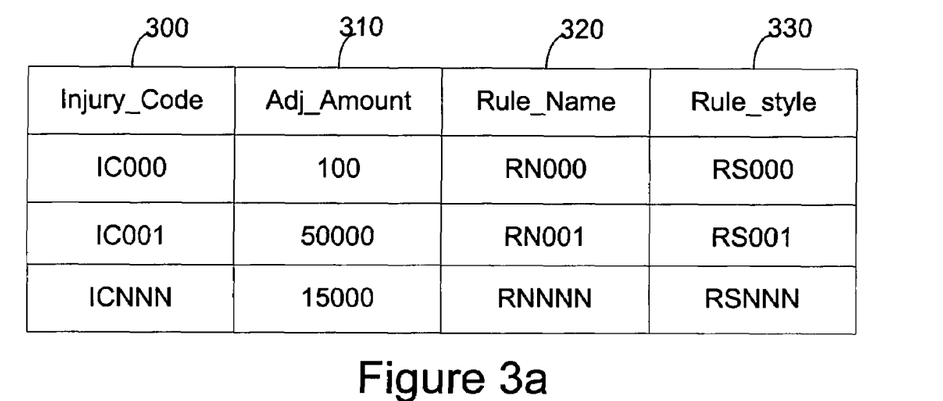
FIG. 3*a* illustrates data elements of a rules data table according to one embodiment.
Figure 3B:
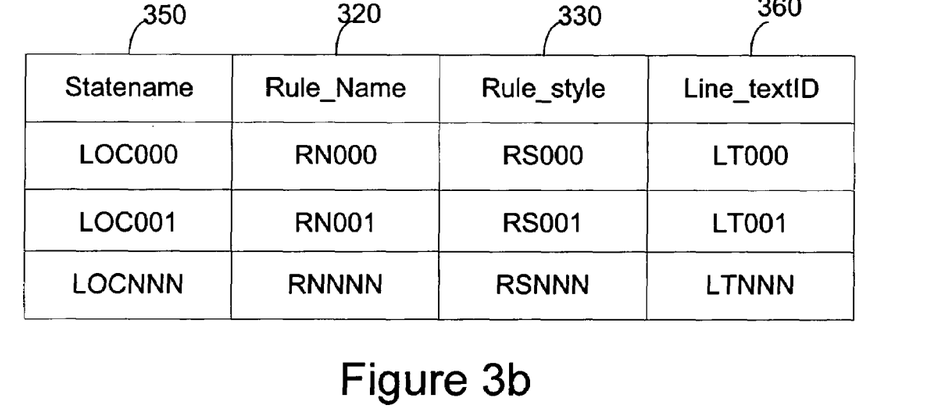
FIG. 3*b* illustrates data elements of a template table according to one embodiment.
Figure 3C:
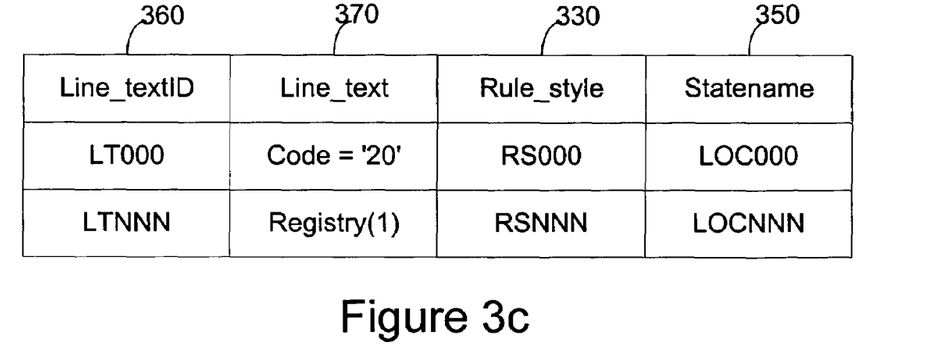
FIG. 3*c* illustrates data elements of a line text table according to one embodiment.

Other types of tables stored in the database 40, in one embodiment, may include a LineText table as shown by way of example in FIG. 3c and a Template table as shown by way of example in FIG. 3b. The LineText table may store lines or other elements of text which may be used to generate the rules. The Template table may include information which may be used by the application program to read each row of data from the rules data table and transform, create or generate the rules data into a rule. In one embodiment, every rule style may have an entry in the Template table. The location to store the transformed rule, the name of the rules data table, the name of the rule style, an identifier for the line text, etc. may also be included in the Template table, in one embodiment.

In step 130 of FIG. 2, the application program initiates the transformation of data stored in the rules data table to rules by reading the rules data. In one embodiment, the KBOpen and the ControlLoad methods may be used to open and load the rules data knowledge base table. In one embodiment, every knowledge base table has a corresponding object class name in the insurance claim-processing program 60. The contents of each row are read one at a time.

In step 140, data entries in each column of the rules data table are used to transform, create, or construct the rules. Entries for columns like rules style and rules name in the rules data table may be used as a key to find a matching record in the Template table. Other data stored in the columns of the rules data may be used to build the rule premise and/or the resulting one or more rules action.

The specific syntax used to construct the rule is specified in the Template for a given rule style 330 and a rule name 320. For example, in one embodiment, rule style RS000 and rule name RN000 may specify:

IFMATCH Col#1 WITH Col#2=Col#3 THEN Col#4=Col#5 where Col#1 through Col#5 entries may be read from data stored in columns 1 through 5 of the rules data table shown in FIG. 3a and where rule style=RS000 and rule name=RN000. The text string corresponding to the above transformed rule may be stored in the Line_Text 370 field of the LineText table shown in FIG. 3c using Line_TextID 360 as a location reference obtained from the Template table shown in FIG. 3b.

Although not explicitly shown, Steps 130 and 140 may be repeated, in one embodiment, to read all rows of the rules data knowledge base table and transform the data to a plurality of rules. On execution of the plurality of rules, applicable to a specific bodily injury claim consultation transaction, the insurance claim processing software 60 may print a consultation report, which summarizes an assessment for the bodily injuries claim.

In one embodiment, the task of updating, modifying or revising of rules may be simplified. To update a business rule, the user or the administrator of the insurance claim processing system 20 may update the data entries stored in the rules data table. By executing steps 130 and 140, the rules may be automatically updated to reflect the changes.

In another embodiment, the task of customizing of rules to meet specific user requirements may also be simplified. To add a new business rule or structurally modify an existing rule, the user or the administrator of the insurance claim processing system 20 may add a new entry to the rule style and rule name table and update the database 40. By executing steps 130 and 140, the rules may be automatically customized to reflect the new changes.

FIGS. 3*a*, 3*b* and 3*c*

Rules data Table, Template Table and Line Text Table in One Embodiment

FIGS. 3*a*, 3*b* and 3*c* illustrate the tabular structure of the Rules data Table, Template Table and Line Text Table according to one embodiment. Only four columns are illustrated for each of the table. In one embodiment, each of the tables may comprise more or fewer columns. In one embodiment, the tables may be implemented in any number of ways, such as a relational database, in a variety of commercially available database management systems. The tables may have as many rows as may be supported by the database management system in which they are implemented. The tables may be accessed (e.g., searched, written to, read from, etc.) through a programming interface or standard access mechanism (e.g., SQL) which is supported by the database management system in which the tables are implemented. The data shown in the various tables in FIGS. 3*a*, 3*b*, and 3*c* are for purposes of example only and are not intended to be limiting.

Figure 4:
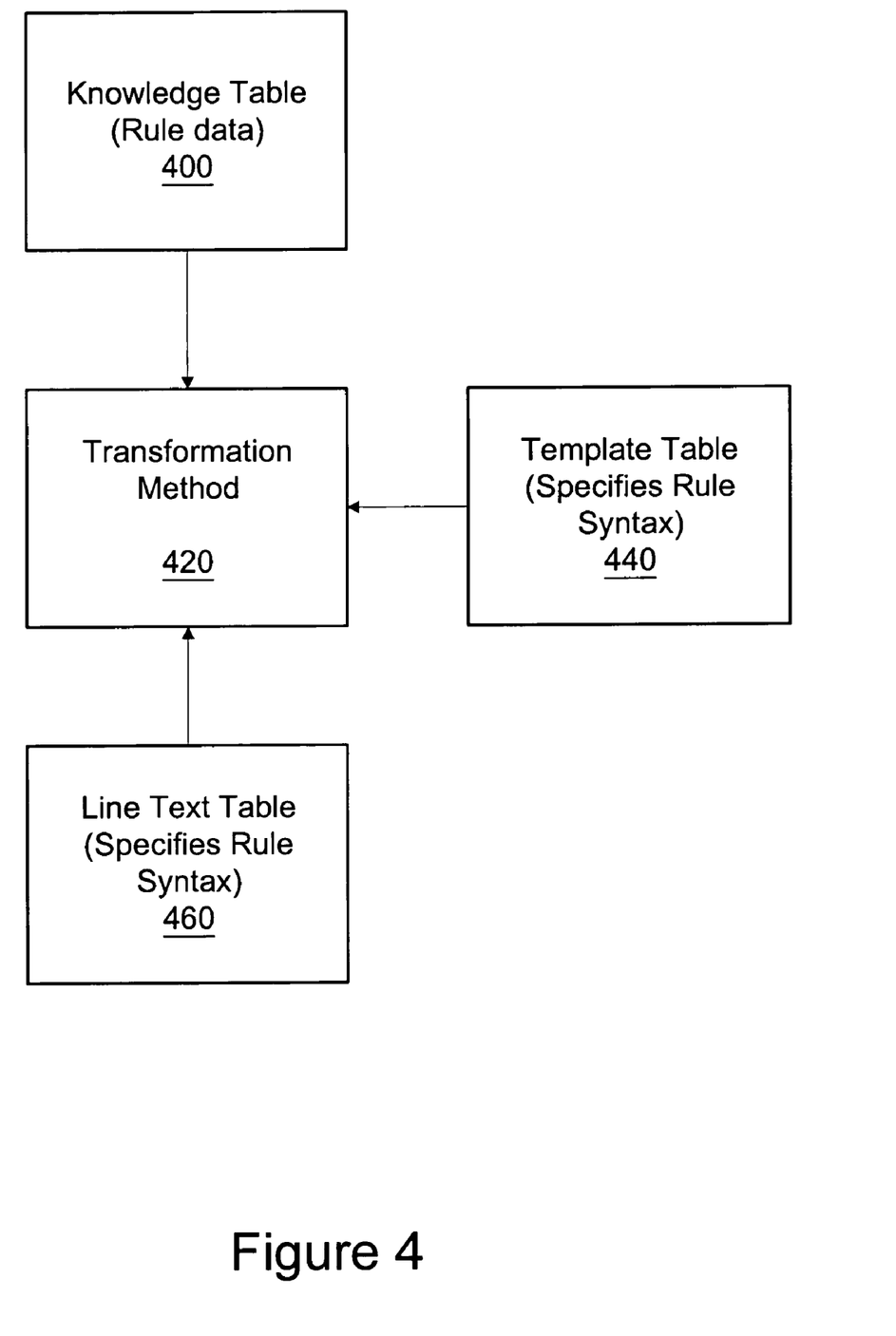
FIG. 4 illustrates a block diagram of the transformation of rules data to rules for assessing bodily injury damages according to one embodiment.

FIG. 4

A Block Diagram of the Transformation of Rules Data to Rules for Assessing Bodily Injury Damages According to One Embodiment In FIG. 4, an embodiment of the transformation of rules data to rules may include a knowledge table 400. In one embodiment, the knowledge table may be a rules data table as shown in FIG. 3*a*. In one embodiment, the knowledge table 400 includes data necessary to transform, or build, or create, or define, or generate rules based on a specified rule structure. The transformation method 420 (as discussed in greater detail with reference to FIG. 2) orchestrates the combining of the data from the knowledge table 400 and the rule syntax specified in the Template table 440. The transformation method 420 may save the rule as text in an associated knowledge base or insurance database.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A computer system comprising:
a central processing unit (CPU);
a memory coupled to the CPU;
a database stored in the memory of the computer system comprising:
  a rules data table comprising a plurality of rows, each of the rows comprising a plurality of business rule data elements and a rules style;
  a template table comprising a plurality of rows, each row of the template table comprising a rules style, wherein the rules style for each row of the template table specifies a syntax for one of a plurality of business rules, wherein each of a plurality of business rules is classified into one of the rule styles, the syntax for a premise and a resulting rule action for a given rule style being common to business rules within the rule style; and
  a text table comprising a plurality of rows, each of the rows comprising a text string specifying a syntax for one of the business rules;
a translator program implemented on the computer system configured to, for two or more rows in the rules data table:
  use the rules style for the row in the rules data table as a key to find a matching record in the template table;
  read two or more of the business rule data elements and the rules style from the row in the rules data table using information from the template table,
  read a text string from the text table;
  and
  combine at least two of the business rule data elements for the row in the rules data table and the syntax for the rules style specified in the template table and the text string of the text table to form a business rules,
and
a rules engine configured to assess a value of one or more bodily injury insurance claims as a function of the formed business rules.

2. The system of claim 1, wherein the value of at least one of the insurance claims comprises a trauma severity value.

3. The system of claim 1, wherein at least one of the formed business rules comprises logical instructions for assessing the value of at least one of the insurance claims.

4. The system of claim 1, wherein at least one of the formed business rules comprises a premise and one or more resulting actions for assessing the value of at least one of the insurance claims.

5. The computer system of claim 1, wherein the template table comprises a rule name and a rule style for at least two of the business rules.

6. The computer system of claim 1, wherein the template table comprises a line text identifier for text in the text table.

7. A method implemented on a computer system, comprising:
providing a plurality or business rule data elements and a rules style for each of a plurality of rows in a rules data table in a memory of the computer system;
providing a template table comprising a plurality of rows, each row of the template table comprising a rules style, wherein the rules style for each row of the template table specifies a syntax for one of a plurality of business rules, wherein each of a plurality of business rules is classified into one of the rule styles, the syntax for a premise and a resulting rule action for a given rule style being common to business rules within the rule style;
providing a text table comprising a plurality of rows, each of the rows comprising a text string specifying a syntax for one of the business rules;
for two or more rows in the rules data table, the computer system:

using the rules style for the row in the rules data table as a key to find a matching record in the template table;
reading data from the row in the rules data table using information from the template table;
reading a text string from the text table; and
combining two or more of the business rule data elements for the row in the rules data table and the syntax for the rules style specified in the template table and the text string of the text table to form one or more business rules for processing one or more bodily injury insurance claims; and
providing at least one of the formed business rules to a rules engine, wherein the formed business rule is executable by the rules engine to process at least one of the insurance claims.

8. The method of claim 7, further comprising processing at least one of the insurance claims by executing at least one of the formed business rules in the rules engine.

9. The method of claim 7, wherein at least one of the formed business rules is executable by the rules engine to assess a trauma severity value of a bodily injury insurance claim.

10. The method of claim 7, wherein the rules engine comprises program instructions which are executable by a computer to access at least one of the formed business rules, and to assess at least one of the insurance claim based on the accessed business rule.

11. The method of claim 7, wherein at least one of the formed business rules comprises a premise and at least one resulting action.

12. The method of claim 7, further comprising modifying at least one of the business rule data elements in the memory and combining at least two of the business rule data elements, including at least one of the modified business rule data elements, to form one or more modified business rules.

13. The method of claim 7, further comprising modifying one or more of the business rule data elements as a function of at least one business requirement of an insurance organization.

14. The method of claim 13, further comprising modifying at least one of the business rules in response to modifying at least one of the business rule data elements.

15. The method of claim 13, further comprising forming at least one new business rule in response to modifying at least one of the business rule data elements.

16. A computer readable medium comprising program instructions implemented on a computer system, wherein the program instructions are computer-executable to implement:
providing a plurality or business rule data elements and a rules style for each of a plurality of rows in a rules data table in a memory of the computer system;
providing a template table comprising a plurality of rows, each row of the template table comprising a rules style, wherein the rules style for each row of the template table specifies a syntax for one of a plurality of business rules, wherein each of a plurality of business rules is classified into one of the rule styles, the syntax for a premise and a resulting rule action for a given rule style being common to business rules within the rule style;
providing a text table comprising a plurality of rows, each of the rows comprising a text string specifying a syntax for one of the business rules;
for two or more rows in the rules data table, the computer system:
using the rules style for the row in the rules data table as a key to find a matching record in the template table;
reading data from the rules data table using information from the template table;
reading a text string from the text table; and
combining two or more of the business rule data elements for the row in the rules data table and the syntax for the rules style specified in the template table and the text string of the text table to form one or more business rules for processing one or more bodily injury insurance claims; and
providing at least one of the formed business rules to a rules engine, wherein the formed business rule is executable by the rules engine to process at least one of the insurance claims.

17. The computer readable medium of claim 16, wherein the program instructions are further computer-executable to implement processing at least one of the insurance claims by executing at least one of the formed business rules in the rules engine.

18. The computer readable medium of claim 16, wherein at least one of the formed business rules is executable by the rules engine to assess a trauma severity value of a bodily injury insurance claim.

19. The computer readable medium of claim 16, wherein the rules engine comprises program instructions which are executable by a computer to access at least one of the formed business rules, and to assess at least one of the insurance claims based on the accessed business rule.

20. The computer readable medium of claim 16, wherein at least one of the formed business rules comprise a premise and at least one resulting action.

21. The computer readable medium of claim 16, wherein the program instructions are further computer-executable to implement:
modifying one or more of the business rule data elements in the memory and combining at least two of the business rule data elements, including at least one of the modified business rule data elements, to form one or more modified business rules.

22. The computer readable medium of claim 16, wherein the program instructions are further computer-executable to implement:
modifying one or more of the business rule data elements as a function of business requirements of an insurance organization.

23. The computer readable medium of claim 22, wherein the program instructions are further computer-executable to implement:
modifying at least one of the business rules in response to modifying at least one of the business rule data elements.

24. The computer readable medium of claim 22, wherein the program instructions are further computer-executable to implement:
forming at least one new business rule in response to modifying at least one of the business rule data elements.

* * * * *